United States Patent
Sardaryan et al.

(10) Patent No.: US 10,397,137 B2
(45) Date of Patent: Aug. 27, 2019

(54) DISTRIBUTED FPGA SOLUTION FOR HIGH-PERFORMANCE COMPUTING IN THE CLOUD

(71) Applicant: LDA Technologies Ltd., Mississauga (CA)

(72) Inventors: Sergey Sardaryan, Mississauga (CA); Mariya Sukiasyan, Mississauga (CA); Vahan Sardaryan, Mississauga (CA)

(73) Assignee: LDA TECHNOLOGIES LTD., Mississauga (CA)

( * ) Notice: Subject to any disclaimer, the term of this patent is extended or adjusted under 35 U.S.C. 154(b) by 116 days.

(21) Appl. No.: 15/809,553

(22) Filed: Nov. 10, 2017

(65) Prior Publication Data
US 2018/0131635 A1 May 10, 2018

Related U.S. Application Data

(60) Provisional application No. 62/420,274, filed on Nov. 10, 2016.

(51) Int. Cl.
| | |
|---|---|
| *H04L 12/933* | (2013.01) |
| *H04L 29/08* | (2006.01) |
| *H04L 12/931* | (2013.01) |
| *G06K 7/04* | (2006.01) |
| *G06K 19/077* | (2006.01) |
| *G06F 9/455* | (2018.01) |

(52) U.S. Cl.
CPC ............ *H04L 49/15* (2013.01); *H04L 49/352* (2013.01); *H04L 67/10* (2013.01); *G06F 9/45533* (2013.01); *G06F 9/45558* (2013.01)

(58) Field of Classification Search
USPC ................................. 709/223, 250, 219, 224
See application file for complete search history.

(56) References Cited

U.S. PATENT DOCUMENTS

| | | | | |
|---|---|---|---|---|
| 6,536,670 B1 * | 3/2003 | Postman | ............... | G06F 1/1626 |
| | | | | 235/487 |
| 6,763,041 B1 * | 7/2004 | Vassallo | ............... | H04J 3/1641 |
| | | | | 370/465 |
| 8,787,975 B2 * | 7/2014 | Kanojia | ................. | H04H 20/57 |
| | | | | 455/412.1 |
| 2003/0118058 A1 * | 6/2003 | Kim | ........................ | H04L 49/30 |
| | | | | 370/535 |

(Continued)

*Primary Examiner* — Jude Jean Gilles
(74) *Attorney, Agent, or Firm* — Bereskin & Parr LLP/S.E.N.C.R.L., s.r.l.

(57) ABSTRACT

A data processing system, method and device. A device can include a plurality of data cards having host interface connectors initially configured to transmit signals according to a first communication protocol and data card connectors that communicate with external devices using a different communication protocol. The data cards are converted so that the host interface connectors also transmit signals using the second communication protocol. The plurality of data cards are interconnected so that signals can be routed through the data cards to provide desired data processing functions. A cross-point switch fabric allows the signals to be routed to the appropriate data card or cards. Multiple devices can be interconnected to provide a distributed data processing grid providing access to the data processing functions for external devices that do not communicate using the first communication protocol.

29 Claims, 9 Drawing Sheets

(56) References Cited

U.S. PATENT DOCUMENTS

| | | | | |
|---|---|---|---|---|
| 2004/0264581 | A1* | 12/2004 | Perry | G01L 25/00 375/257 |
| 2005/0068191 | A1* | 3/2005 | Eschke | B60R 16/0231 340/13.25 |
| 2007/0233907 | A1* | 10/2007 | Yoshikawa | G06F 13/387 710/26 |
| 2008/0121272 | A1* | 5/2008 | Besser | G05F 1/67 136/248 |
| 2008/0179949 | A1* | 7/2008 | Besser | H02J 7/0068 307/24 |
| 2011/0202163 | A1* | 8/2011 | Kim | G21D 3/04 700/110 |

* cited by examiner

DISTRIBUTED FPGA SOLUTION FOR HIGH-PERFORMANCE COMPUTING IN THE CLOUD

CROSS-REFERENCE TO RELATED APPLICATIONS

This application claims priority from the U.S. provisional patent application No. 62/420,274, filed on Nov. 10, 2016 entitled "DISTRIBUTED FPGA SOLUTION FOR HIGH-PERFORMANCE COMPUTING IN THE CLOUD" the disclosure of which is incorporated herein by reference in its entirety.

FIELD

The described embodiments relate to system and method for distributed data processing and in particular systems and methods for distributed data processing using Field Programmable Gate Arrays (FPGAs).

BACKGROUND

Data cards, such as those containing Field Programmable Gate Array (FPGA) devices, may be used in various applications including networking applications. FPGAs can perform various computational and acceleration tasks that may increase in the complexity over time with the advancement of technology.

In some applications, the data cards may be used in data centers, e.g. housed or deployed in rackmount compatible or "rackable" servers. When data cards are housed or deployed in rackmount compatible or "rackable" servers, it may be difficult to access all available connections on the data cards.

Currently, a number of different approaches are implemented to make use of FPGAs in data centers. Often, these approaches are targeted at increasing the number of FPGA-powered appliances. However, increasing the use of FPGA in existing data center implementations is often difficult and may require significant modifications to existing data center hardware.

SUMMARY

In a broad aspect, there is provided a method for executing a plurality of data processing functions. The method can include providing a plurality of data cards, each data card in the plurality of data cards having a printed circuit board, a plurality of host interface connectors connectable with an internal data bus of a host computer system to transfer data card signals compliant with a first signaling standard between the data card and the host computer system, and a plurality of data card connectors connectable with at least one external device to communicate with the at least one external device using external data card signals compliant with a signaling standard different from the first signaling standard; for each data card in the plurality of data cards, converting the data card to convert the data card signals transmitted from the plurality of host interface connectors from being compliant with the first signaling standard to be new data card signals compliant with a second signaling standard different from the first signaling standard; providing a plurality of electrical connections between the plurality of data cards by, for each data card in the plurality of data cards, connecting at least one host interface connector in the plurality of host interface connectors for that data card to at least one host interface connector of another data card in the plurality of data cards; providing incoming data to at least one data card in the plurality of data cards; routing derived data signals, the derived data signals being derived from the incoming data and compliant with the second signaling standard, through the plurality of data cards via the plurality of electrical connections and, for each data card in the plurality of data cards, at least one host interface connector in the plurality of host interface connectors for that data card; and performing the plurality of data processing functions within the plurality of data cards based on the derived data signals.

In some embodiments, the method may include, before routing the derived data signals through the plurality of data cards, determining a function allocation by, for each data processing function of the plurality of data processing functions, allocating that data processing function to an associated data card within the plurality of data cards; and, determining a route for routing the derived data signals through the plurality of data cards based, at least in part, on the function allocation for the plurality of data cards.

In some embodiments, the plurality of data cards includes a plurality of FPGA boards, each FPGA board in the plurality of FPGA boards initially operating according to a Peripheral Component Internet (PCI) Express standard such that, for each FPGA board in the plurality of FPGA boards, the first signaling standard for the plurality of host interface connectors for that data card is a PCI Express standard, the second signaling standard being different from the PCI Express standard.

In some embodiments, the second signaling standard is Ethernet; and, for each data card in the plurality of data cards, converting the data card to convert the data card signals transmitted from the plurality of host interface connectors from being compliant with the PCI Express standard to be new data card signals compliant with the Ethernet standard involves implementing an Ethernet logic core on that data card to support the Ethernet Standard and providing a carrier signal of Ethernet frequency for the Ethernet standard.

In some embodiments, the method may include monitoring operation of each data card in the plurality of data cards; identifying at least one ineffective data card in the plurality of data cards; determining at least one data processing function of the plurality of data processing functions allocated to the at least one ineffective data card; determining an updated function allocation, at least in part by, for each data processing function formerly allocated to the at least one ineffective data card, allocating that data processing function to a replacement data card in the plurality of data cards; and determining an updated route for routing the derived data signals through the plurality of data cards based, at least in part, on the updated function allocation.

In some embodiments, the method may include, after identifying the at least one ineffective data card in the plurality of data cards, sending an ineffective card signal to an external operator to notify the external operator of the ineffective card.

In some embodiments, determining the function allocation involves operating a card management data processor in electronic communication with the plurality of electrical connections and the plurality of data cards to determine the function allocation.

In some embodiments, operating the card management data processor to determine the function allocation involves communicating the plurality of data processing functions to the card management data processor, determining a plurality of resources provided by the plurality of data cards, and mapping each data processing function in the plurality of data processing functions to a corresponding resource in the plurality of resources to define the function allocation for the plurality of data cards; and, the card management data processor determines the route for routing the data through the plurality of data cards based, at least in part, on the function allocation.

In some embodiments, mapping each data processing function in the plurality of data processing functions to the corresponding resource in the plurality of resources to provide the function allocation can involve determining a plurality of sets of substitutable resources, by, for each function of at least some functions in the plurality of data processing functions, determining a set of substitutable resources in the plurality of resources, each resource in the set of substitutable resources being suitable for providing that function, where each set of substitutable resources in the plurality of resources comprises at least two resources provided by at least two separate data cards of the plurality of data cards, and that data processing function is separately providable by each resource of the at least two resources; and the method can further include, for at least one function of the at least some functions in the plurality of data processing functions, updating the function allocation to replace one data card in the at least two separate data cards with a different data card in the at least two separate data cards.

In some embodiments, updating the function allocation to replace one data card in the at least two separate data cards with a different data card in the at least two separate data cards can occur while performing the plurality of data processing functions within the plurality of data cards based on the derived data signals.

In some embodiments, operating the card management data processor to determine the plurality of resources provided by the plurality of data cards can involve receiving a plurality of resource information signals at the card management data processor, the plurality of resource information signals being compliant with the second signaling standard and including, for each data card in the plurality of data cards, a resource information signal for that data card indicating at least one resource available on that data card.

In some embodiments, at least one data card in the plurality of data cards can include a line card, the incoming data being provided to the at least one data card via the linecard.

In another broad aspect, there is provided a data processing system that can include a plurality of data cards, each data card in the plurality of data cards can have a printed circuit board, a plurality of host interface connectors connectable to an internal data bus of a host computer system to transfer data card signals compliant with a first signaling standard between the data card and the host computer system, and, a plurality of data card connectors connectable to at least one external device to communicate with the at least one external device using external data card signals compliant with a signaling standard different from the first signaling standard; at least one signal generator for generating a configuration signal to support, for each data card in the plurality of data cards, transmission of new data card signals from the plurality of host interface connectors, the new data card signals being compliant with a second signaling standard different from the first signaling standard; a plurality of electrical connections between the plurality of data cards for carrying the new data card signals compliant with the second signaling standard, the plurality of electrical connections comprising, for each data card in the plurality of data cards, an electrical connection connecting at least one host interface connector in the plurality of host interface connectors for that data card to at least one host interface connector of another data card in the plurality of data cards; and an external data connection for providing incoming data to at least one data card in the plurality of data cards; where during operation, the plurality of electrical connections route derived data signals, the derived data signals being derived from the incoming data and compliant with the second signaling standard, through the plurality of data cards via the plurality of electrical connections and, for each data card in the plurality of data cards, at least one host interface connector in the plurality of host interface connectors for that data card, to perform a plurality of data processing functions within the plurality of data cards based on the derived data signals.

In some embodiments, the system can include at least one card management data processor for determining a function allocation by, for each data processing function of the plurality of data processing functions, allocating that data processing function to an associated data card within the plurality of data cards; where during operation, each data processing function of the plurality of data processing functions is performed by the associated data card within the plurality of data card according to the function allocation, and the plurality of electrical connections route the derived data signals through the plurality of data cards based, at least in part, on the function allocation.

In some embodiments, the plurality of data cards can include a plurality of FPGA boards, each FPGA board in the plurality of FPGA boards operating, during operation, according to a Peripheral Component Internet (PCI) Express standard; and, the first signaling standard for the plurality of host interface connectors for that data card can be a PCI Express standard, with the second signaling standard being different from the PCI Express standard.

In some embodiments, the second signaling standard is Ethernet; each data card in the plurality of data cards includes an Ethernet logic core on that data card to support the Ethernet Standard; and the configuration signal is a carrier signal of Ethernet frequency for the Ethernet standard.

In some embodiments, during operation, the at least one card management data processor, monitors operation of each data card in the plurality of data cards; identifies at least one ineffective data card in the plurality of data cards; determines at least one data processing function of the plurality of data processing functions allocated to the at least one ineffective data card; determines an updated function allocation, at least in part by, for each data processing function formerly allocated to the at least one ineffective data card, allocating that data processing function to a replacement data card in the plurality of data cards; and determines an updated route for routing the derived data signals through the plurality of data cards based, at least in part, on the updated function allocation.

In some embodiments, during operation, the at least one card management data processor, after identifying the at least one ineffective data card in the plurality of data cards, sends an ineffective card signal to an external operator to notify the external operator of the ineffective card.

In some embodiments, during operation, the card management data processor may be in in electronic communication with the plurality of electrical connections and the plurality of data cards to determine the function allocation.

In some embodiments, during operation, the card management data processor can determine the function allocation by determining the plurality of data processing functions from the incoming data, determining a plurality of resources provided by the plurality of data cards, and mapping each data processing function in the plurality of data processing functions to a corresponding resource in the plurality of resources to implement the function allocation within the plurality of data cards; and, the card management data processor, during operation, can determine the route for routing the data through the plurality of data cards based, at least in part, on the function allocation.

In some embodiments, to map each data processing function in the plurality of data processing functions to the corresponding resource in the plurality of resources to provide the function allocation, the card management data processor, in operation, determines a plurality of sets of substitutable resources, by, for each function of at least some functions in the plurality of data processing functions, determining a set of substitutable resources in the plurality of resources, each resource in the set of substitutable resources being suitable for providing that function; each set of substitutable resources in the plurality of resources includes at least two resources provided by at least two separate data cards of the plurality of data cards; that data processing function is separately providable by each resource of the at least two resources; and, for at least one function of the at least some functions in the plurality of data processing functions, the card management data processor further, during operation, updates the function allocation to replace one data card in the at least two separate data cards with a different data card in the at least two separate data cards.

In some embodiments, during operation the card management data processor updates the function allocation to replace one data card in the at least two separate data cards with a different data card in the at least two separate data cards while the plurality of data cards are performing the plurality of data processing functions based on the derived data signals.

In some embodiments, during operation the card management data processor determining the plurality of resources provided by the plurality of data cards involves receiving a plurality of resource information signals at the card management data processor, the plurality of resource information signals being compliant with the second signaling standard and comprising, for each data card in the plurality of data cards, a resource information signal for that data card indicating at least one resource available on that data card.

In some embodiments, the at least one data card in the plurality of data cards can include a line card, the incoming data being provided to the at least one data card via the linecard.

In some embodiments, for each data card in the plurality of data cards, the at least one signal generator includes an internal clock signal generator on that data card; and during operation, the internal clock signal generator provides the configuration signal to each host interface connector in the plurality of host interface connectors on that data card to convert the data card signals originating from that host interface connectors from being compliant with the first signaling standard to the new data card signals compliant with the second signaling standard.

In some embodiments, the at least one signal generator includes an external clock signal generator external to the plurality of data cards; and, during operation, and for each data card in the plurality of data cards, the external clock signal generator provides the configuration signal to each host interface connector in the plurality of host interface connectors to convert the data card signals originating from that host interface connectors from being compliant with the first signaling standard to the new data card signals compliant with the second signaling standard.

In another broad aspect, there is provided a data card housing that includes a plurality of data card receptacles for receiving a plurality of data cards, each data card in the plurality of data cards comprising a plurality of host interface connectors connectable to an internal data bus of a host computer system to transfer data card signals compliant with a first signaling standard between the data card and the host computer system; a plurality of electrical connections between the plurality of data card receptacles for connecting to, for each data card receptacle in the plurality of data card receptacles, the plurality of host interface connectors of a data card received in that data card receptacle, the plurality of electrical connections comprising, for each data card receptacle in the plurality of data card receptacles, a plurality of card connectors for connecting to the plurality of host interface connectors of a data card received in that data card receptacle; and at least one external data communication port for i) receiving incoming data and providing the incoming data to the plurality of electrical connections, and ii) receiving outgoing data from the plurality of electrical connections and transmitting the outgoing data to at least one external device, external to the data card housing; where during operation, when the plurality of data cards are provided in the plurality of data card receptacles and connected to the plurality of electrical connections, the plurality of electrical connections route derived data signals, the derived data signals being derived from the incoming data, through the plurality of data cards via the plurality of electrical connections and, for each data card receptacle having a data card, at least one host interface connector in the plurality of host interface connectors for that data card, to perform a plurality of data processing functions within the plurality of data cards based on the derived data signals.

In some embodiments, the housing may also include at least one signal generator for generating a configuration signal, the at least one signal generator being electronically connectable to each data card receptacle in the plurality of data card receptacles to supply the configuration signal to a data card contained in that data card receptacle to support transmission of new data card signals from the plurality of host interface connectors of that data card, the new data card signals being compliant with a second signaling standard different from the first signaling standard, such that, during operation, the derived data signals routed by the plurality of electrical connections are compliant with the second signaling standard.

In some embodiments, the housing may also include at least one card management data processor linked to the plurality of electrical connections, where, during operation when a plurality of data cards are provided in the plurality of data card receptacles, the at least one card management data processor, for each data card receptacle in the plurality of data card receptacles containing a data card, receives receptacle-specific data card resource information via the plurality of electrical connections regarding the data card received in that data card receptacle, and determines at least one resource receptacle-specific resources available on the data card received in that data card receptacle; and then determines a function allocation by, for each data processing function of the plurality of data processing functions, allocating that data processing function to a selected data card receptacle of the plurality of data card receptacles based on an associated data card received in that selected data card receptacle; such that during operation, each data processing function of the plurality of data processing functions is performed by the associated data card within the plurality of data card according to the function allocation, and the plurality of electrical connections route the derived data signals through the plurality of data cards based, at least in part, on the function allocation.

BRIEF DESCRIPTION OF THE DRAWINGS

A preferred embodiment of the present invention will now be described in detail with reference to the drawings, in which.

Figure 1:
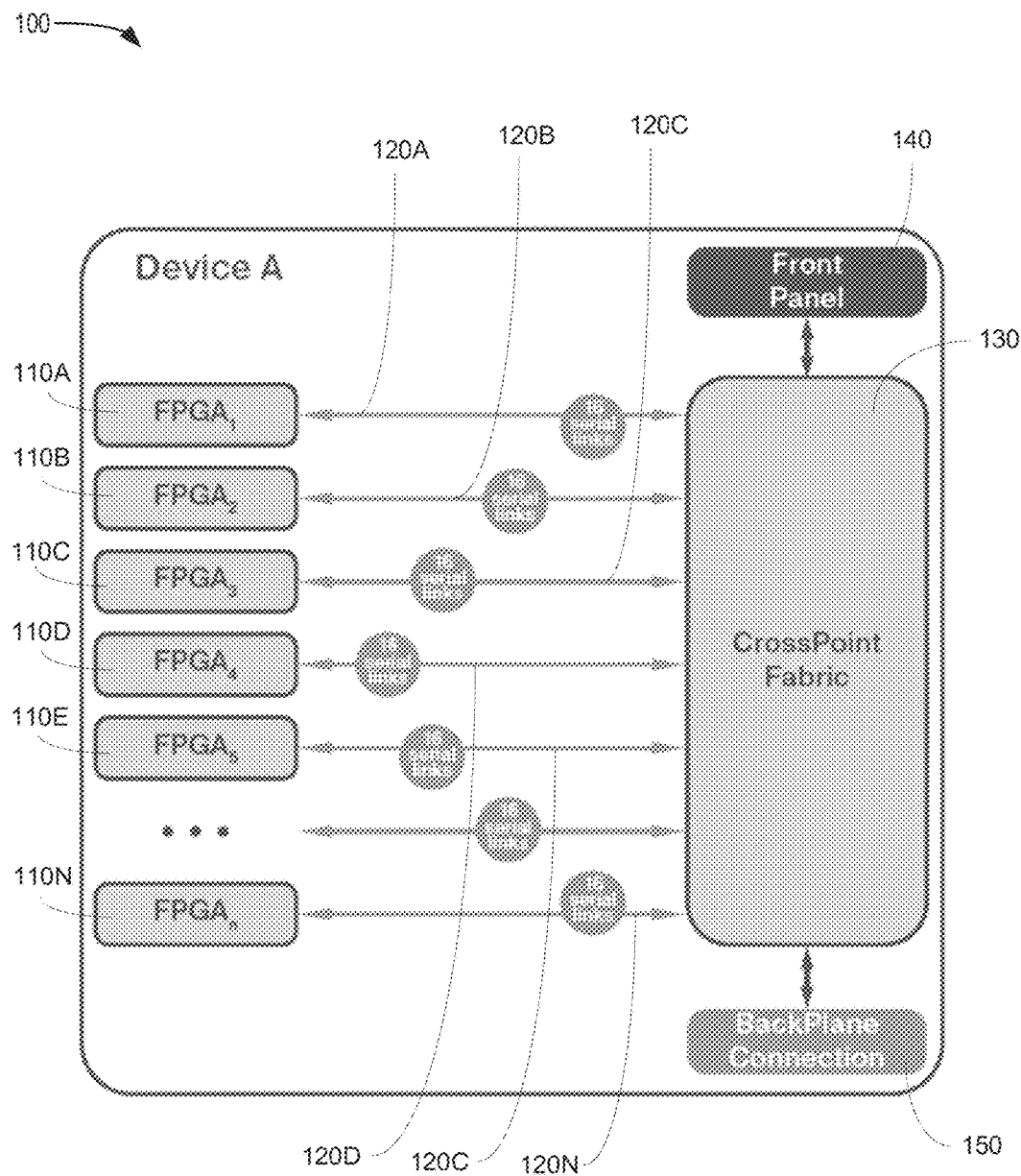
FIG. 1 is an illustration showing a block diagram of an example data processing device in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Modern FPGAs provides resources that can be very useful in data centers. FPGAs can be configured to perform increasingly complex computational and acceleration tasks. As a result, the utility of FPGAs implemented in data centers is likely to grow. Seamless systems and methods for incorporating FPGAs into new and existing data centers may facilitate the adoption of FPGAs in cloud computing environments. This may provide greater computational power and flexibility for cloud computing systems.

Embodiments described herein generally relate to systems and methods for managing data processing resources. In particular, embodiments described herein may facilitate management and distribution of data processing functions amongst a plurality of data cards. The embodiments described herein provide interconnected networks of data cards that may improve processing capabilities and flexibility for various computing implementations, such as data centers for cloud computing.

Some examples of the systems and methods described herein may facilitate access to greater FPGA resources "in the cloud" without requiring substantial modifications to existing server hardware. As a result, embodiments of the system and network architecture described herein may encourage and facilitate the adoption of FPGAs in data centers.

Data cards providing various processing functions are used in many existing computing and networking application. These data cards can be housed or deployed in rack-mount compatible or "rackable" servers. These data cards typically have a number of connectors, which may be referred to herein as host interface connectors, configured to be received by a corresponding connector opening or receptacle or slot in a host computing device or host computer system. The data cards can communicate with the host computer system through these host interface connectors using a pre-defined communication standard.

Embodiments of the systems and methods described herein can convert or repurpose one or more of the host interface connectors for a data card so that those repurposed host interface connectors transmit signals using a different communication standard. The data cards may then be configured into a network or mesh of data cards, using the repurposed connectors to transmit data between, and through, the connected data cards (and to external networks via data card connectors on the data cards). This may enable signals to be routed from an external network to a particular data card or cards required for the particular computational task at hand.

For example, data cards compliant with the Peripheral Component Interconnect Express (PCIe) may communicate with a host computer system using the PCIe protocol. The host interface connectors for these data cards may be provided by PCIe edge connectors that are receivable in a corresponding female PCIe connector or slot. Embodiments described herein may repurpose or convert these edge connectors from the PCIe standard to another standard, such as Ethernet, to enable these PCIe edge connectors to transmit signals in accordance with that other standard and thus be used for data transfer between, and through, data cards (and to and from external devices).

Depending on the particular application for a data card, the signaling requirements for that card may differ. In networking communication, for example, depending on the choice of communication standard employed and the bandwidth required, the number of PCIe links needed for data card-to-motherboard communication can vary. Some networking applications may rely on PCIe for configuration purposes only, so that PCIe bandwidth may not be a critical factor for network operation. At the same time, many networking applications can benefit from having an increased number of network links available. Accordingly, repurposing PCIe links (i.e. repurposing host interface connectors) to operate as high-speed network links to provide high-speed communication links that may pass through a given data card and be accessible externally can provide additional communication links.

Embodiments described herein may repurpose host interface connectors, such as PCIe edge connectors, into high-speed network connectors, such as Ethernet links, to enable for high-speed data transport in and out of data cards, such as FPGA data cards. The host interface connectors for multiple data cards may be interconnected through a non-blocking cross-point switch fabric within a data processing device. This may allow multiple data cards to be interconnected in various configurations, such as star or daisy-chain configurations for example. This may provide a data card device that can operate as a substantially code-free resource ready to be used for data processing functions.

In some embodiments, there is provided a distributed FPGA grid device having multiple FPGA boards interconnected using the same data communication protocol. The FPGA boards may be interconnected with high-speed links, both inside the device and outside (if there is more than one device connected to the network). This may provide a mesh of FPGA boards that can be accessed to provide required data processing functions.

In some embodiments, a virtual device driver may be used to facilitate data transmission to and from networked data cards. Embodiments implementing a virtual device driver framework may provide an abstraction level for data card resources to be accessed remotely by servers and other computing devices. In such embodiments a virtual driver may be loaded into an operating system (either physical or virtual) and may mimic the presence of actual FPGA hardware in the system. This may enable the computing device to access the resources provided by remotely connected data cards via the virtual driver as if those cards were installed locally.

Referring now to FIG. 1, shown therein is an example data processing device or data processing system 100 in accordance with an example embodiment. The device 100 can be used to provide a plurality of data processing functions. The device 100 can be connected to various external devices to receive incoming data signals from, and transmit outgoing data signals to, those external devices.

The data processing device 100 includes a plurality of data cards 110A-110N. In general, the data cards 110 can be specialized computing devices configured to accelerate or provide specialized processing tasks. For example, data cards 110 may be provided to receive data from other devices 100 (or other data cards 110 for data encryption/decryption, networking status monitoring (e.g. deep packet monitoring), data analysis (e.g. statistical analysis of financial data and image processing) and carrying out low-latency transactions (e.g. high frequency trading). Specialized processing may be carried out using data card processors such as programming logic such as Field Programmable Gate Arrays (FPGAs).

Each data card 110 generally includes a printed circuit board (PCB), with various components such as input/output interfaces, memory, and processors. For example, as shown in FIG. 1, the processor of each data card 110 may be a field programmable gate array (FPGA).

The data cards 110 may be provided as computer expansion cards installable into an interface of a host computer system. In some cases, the device 100 may include a data card housing into which the data cards 110 are receivable. The data card housing may include a plurality of data card receptacles for receiving a plurality of data cards 110.

Figure 6:
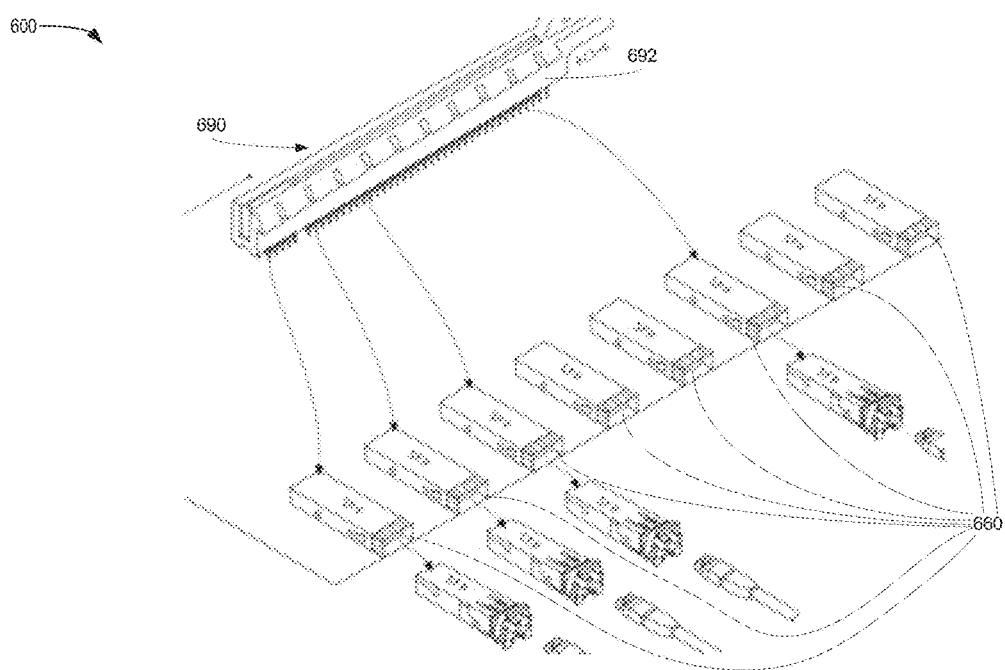
FIG. 6 is an illustration showing a perspective schematic view of a portion of an example data processing device in accordance with an example embodiment.
Figure 7:
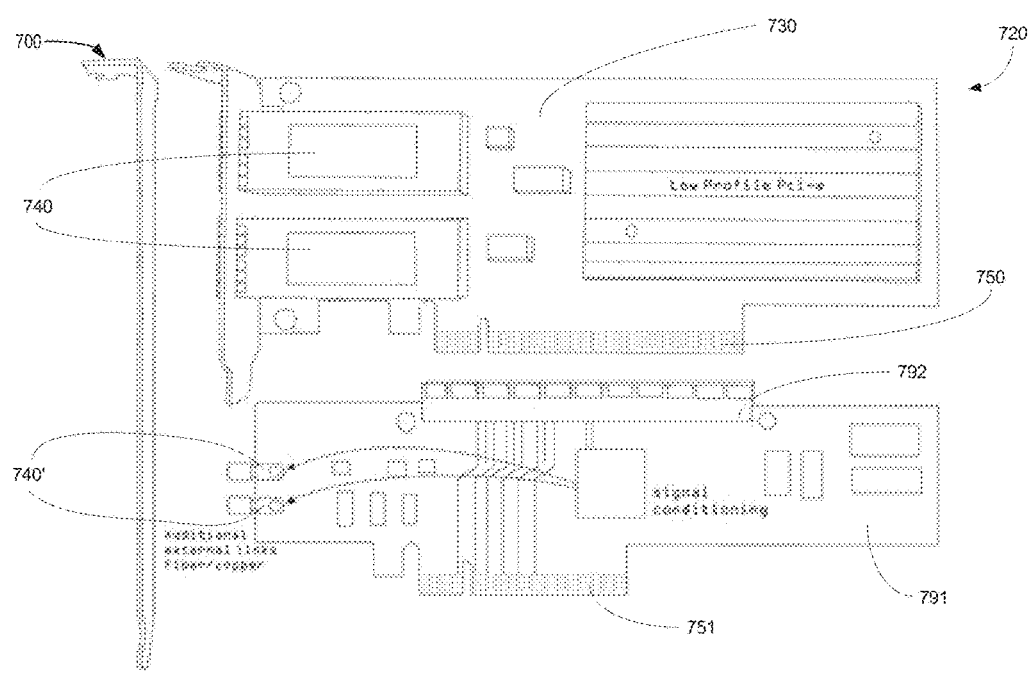
FIG. 7 is an illustration showing a perspective schematic view of a portion of another example data processing device in accordance with an example embodiment.

To provide high-speed data transfer between the data cards 110 and the network (including the "outside" world) the device 100 and data cards 110 may have a number of interfaces (examples of which are shown in FIGS. 6 and 7 described herein below).

Each data card 110 may include a plurality of host interface connectors disposed on the PCB. The host interface connectors can include appropriate connections to interface with the host computer. The host interface connectors may be connectable with an internal data bus of a host computer system to transfer data between the data card and host computer system. For example, the host interface connectors may be received in the host computer system or device housing via a corresponding opening or receptacle. In the case of a computer expansion card, the host interface connector may be edge connectors of the expansion card for interfacing with the computer (i.e. the host).

The data card housing may include a plurality of electrical connections. The electrical connections may include a plurality of card connectors for each data card receptacle for connecting to the plurality of host interface connectors of a data card received in that data card receptacle.

The data card 110 may initially be configured to transfer data card signals compliant with a first signaling standard using the host interface connectors between the data card 110 and the host computer system. For example, the data card 110 may be manufactured to be received in a PCIe and thus may include logic associated with the PCIe standard pre-installed or hardcoded. As shown in FIG. 1, the data card 110 may configure the host interface connectors according to the PCI Express (PCIe) protocol to provide PCIe links 120. Thus, the host interface connectors for the data cards 110 can be configured to transfer data card signals in accordance with the PCIe standard.

Each data card 110 can also contain a plurality of data card connectors. As used herein, the term "data card connectors" may refer to all other connectors and interfaces disposed on the data card 110 (e.g. on the PCB) to which electrical or electronic connections or cabling with the appropriate plugs may be used to connect to the data card connectors. The data card connectors may be connectable with at least one external device to communicate with the external device using external data card signals compliant with a signaling standard different from the first signaling standard. For example, the data card connectors may be USB, SATA, SFP, and/or QSFP connectors configured as interfaces for network communication.

The device 100 can also include external communications ports. The external data communication port can be configured to receive incoming data from external devices. The device 100 may provide the incoming data to the plurality of electrical connections coupled to the host interface connectors. The external data communication ports can also receive outgoing data from the data cards (via the host interface connectors and the plurality of electrical connections) and transmit the outgoing data to at least one external device, external to the data card housing.

The ports may be disposed on an external panel of the housing of device 100 for ease of access. For example the external communication interfaces may be provided on a front panel 140 of the housing. The plurality of external communication ports can be accessible by a user of a data card 110 to access resources (physical or electronic) on the data card 110 without accessing the data card 110 directly. This may allow external devices to access the resources provided by the data cards 110.

The external communication ports may provide a user with easier access to the connections available on a data card 110. Particularly, when the data card 110 is hosted on the back of a rackable server, access to the connectors of the data card 110 may be restricted. For example, access to the host interface connectors (e.g. the edge connectors of the data card 110) may be restricted. Externally accessible ports such as the external communication ports may be linked to the data card connectors and data card host interface connectors to provide access to internally available links. For instance, if the data card 110 is a PCIe-compliant FPGA card, the PCIe links 120 provided on the edge connectors, which otherwise might not be available for use, can be made accessible and thus usable by a user of the device 100 or an external device communicating with device 100.

The device 100 can further include a plurality of electrical connections, such as signaling traces on a printed circuit board, for connecting the data card connections and the host interface connections to the external communications ports.

Depending on the choice of communication standard employed and the bandwidth required, the number of PCIe links 120 available on a data card 110 needed for a card-to-motherboard communication (i.e. via the host interface connectors) can vary. Some networking applications may rely on PCIe links 120 for configuration purposes only so that PCIe bandwidth may not be a critical factor for network operation. For instance, if a data card 110 contains programmable devices, such as a Field Programmable Gate Array (FPGA), data card configuration may involve providing programming to the FPGA. However many networking applications, such as high frequency trading, can benefit from making an increased number of network links available. As such, using the PCIe links 120 on the data cards 110 as high-speed network links to provide high-speed communication links that may pass through the data card 110 and be accessible via a device 100 on the network can be advantageous.

In device 100, one or more of the host interface connectors on each data card 110 can be converted or repurposed to transmit data signals compliant with a different signal transmission standard or protocol. That is, each data card 110 may initially be configured so that the host interface connectors transmit signals compliant with a first signaling standard (i.e. communicate according to a first transmission protocol), may be reconfigured to repurpose the host interface connectors to transmit signals compliant with a second signaling standard different form the first signaling standard (i.e. using a different transmission protocol). For example, where the host interface connectors are connectable to corresponding PCIe connectors on a host computing systems (and the data cards 110 initially configured to transmit signals using the PCIe standard via the host interface connectors), the host interface connectors may be repurposed to transmit signals using a different communication standard, such as Ethernet.

The data cards 110 may initially have a library associated with the first signaling standard "hardcoded". Given the widespread use of the PCIe protocol and PCIe receptacles and corresponding data cards, the data cards 110 may have the PCIe protocol hardcoded at the factory. Other signaling protocols (SATA, etc) may also require libraries to be installed in the data card 110 to allow the data card to transmit signals using those protocols. These protocols may not be hardcoded into the data cards 110 but can be installed into the data cards 110 subsequently, e.g. as a logic core.

As many signaling protocols effectively use the same standard, at least on electrical level, in embodiments herein the data cards 110 may be re-configured so that a second signaling protocol is used for signals transmitted via the host interface connectors. For instance, the data cards 110 may be re-configured to use the Ethernet protocol instead of the PCIe protocol for transmitting data using the host interface connectors. Accordingly, the data cards 110 may have the corresponding library or libraries of the second signaling protocol installed thereon. Furthermore, an appropriate configuration signal (e.g. a carrier signal) can be used to facilitate data transmission according to the second signaling protocol. The configuration signal source may be located internally for each data card 110 or externally and can be communicated to the clock pin of the data card 110. The configuration signal may be routed to the clock pin using a dedicated clock signal line or one of the host interface connectors.

The device 100 may include one or more signal generators (not shown) that may be used to repurpose the signals transmitted via one or more of the host interface connectors. The at least one signal generator may generate a configuration signal that can be transmitted to some or all of the host interface connectors in each data card. The configuration signal transmitted to a particular host interface connector can be used to so that data card signals transmitted by the plurality of host interface connectors are no longer compliant with the first signaling standard, but rather are new data card signals compliant with a second signaling standard different from the first signaling standard. This may allow the host interface connectors to be repurposed to transmit signals using a different communication protocol.

In some cases, a single, central signal generator can be communicably coupled to each data card 110 in device 100. For example, the signal generator may be provided as part of the housing of device 100. During operation, this central signal generator can provide a configuration signal to some or all of the host interface connectors for each data card 110. The configuration signal can be used to convert the data card 110 so that the host interface connectors do not transmit data card signals compliant with a first signaling standard (e.g. PCIe) but rather transmit new data card signals compliant with a second signaling standard (e.g. Ethernet).

In some cases, each data card 110 may have its own signal generator (e.g. an internal clock signal generator). During operation, the internal signal generator for each data card 110 can provide the configuration signal to convert data card signals compliant with a first signaling standard to new data card signals compliant with a second signaling standard.

Repurposing a connector may involve converting the signaling standard utilized in connection with the connector. A signaling standard can include a number of signaling standard parameters, such as signal amplitude and signal reference clock frequency. Various examples methods of repurposing a host interface connector are described in further detail in Applicant's co-pending U.S. application Ser. No. 15/493,863 entitled "System and Method for Repurposing Communication Ports" the entirety of which is incorporated herein by reference.

In some embodiments, to repurpose a connector operating according to one signaling standard to a new signaling standard, the frequency of the signals transmitted by that connector may be changed. This can be done by changing a reference clock to correspond to the signaling clock for the new signaling standard. Accordingly, in embodiments herein the configuration signal generated by the one or more signal generators may be a clock signal that has been adjusted to correspond to the desired signaling standard.

However, it may not always be necessary to change the reference clock to change one signaling standard to a new signaling standard. For example, where both the current and new signaling standards operate at the same frequency, the reference clock may not need to be altered. However, other parameters of the signal may be altered, such as the amplitude, to meet the signaling requirements of the new signaling protocol. In such cases, the one or more signal generators may generate a configuration signal to adjust the amplitude of the signals transmitted by the host interface connectors.

In some embodiments, each data card connector, including all SATA connectors, SAS connectors, USB connectors, etc., may operate according to an assigned signaling standard for sending and receiving data, which may include its own reference clock. In some embodiments, the signaling standard parameters associated with the data card connectors may be defined by components internal to the data card.

In some embodiments, each host interface connector, such as each PCIe connector, may operate according to an assigned signaling standard for sending and receiving data, which may include its own reference clock.

In some embodiments the data card connector signaling standard may be different from the initial host interface signaling standard, such that to repurpose a connector from one to the other requires converting the signals passed through a signal line in the connector from one signaling standard to the other. The at least one signal generator may generate a configuration signal that can be used to repurpose a host interface connector to conform to the signaling standard associated with a data card connector on that data card 110.

In some embodiments a data card 110 may comprise a signal line that may be repurposed, such as a signal line of the host interface connector or data card connectors. The signal line may be configured to carry data card signals provided by the data card 110, wherein the data card signals may be compatible with at least a first signaling standard, such as a PCIe, USB or other signaling standard.

While the data card's signal line may initially operate according to a first signaling standard, an external device may be identified for connecting to the data card 110 using the signal line. For example, the connection may be established using either an enclosure or data card extender described below with reference to FIGS. 6 and 7 and in Applicant's co-pending U.S. patent application Ser. No. 15/493,614 entitled "Circuit Board Enclosure and Method for Communications Applications" the entirety of which is incorporated herein by reference. The external device may be configured to provide device signals compliant with a second signaling standard, such as Ethernet signaling standard. As such, data card signals compatible with the first signaling standard may not be readable by the external device and device signals compliant with the second signaling standard may not be readable by the data card 110 (at least as initially configured) when received via the signal line.

The data card signals may then be converted to new data card signals compliant with the second signaling standard and readable by the external device. The signal line may then be operated as a data link between the data card 110 and the external device and may be operated in compliance with the second signaling standard to carry the new data card signals such that the new data card signals communicated to the external device are compliant with the second signaling standard and are readable by the external device.

As shown in the example of device 100, the plurality of data cards 110 can include a plurality of FPGA data cards. Each FPGA board may be initially configured to operate according to the PCIe standard such that the first signaling standard for the plurality of host interface connectors for that data card is a PCI Express standard. The FPGA boards may then be repurposed to use a second signaling standard different from the PCI Express standard, such as Ethernet.

PCIe-compliant FPGA cards/boards 110 may have PCIe links 120 available that may be reconfigured as high-speed serial links. In some implementations, PCIe links 120 on the FPGA cards 110 that are normally used exclusively for configuration purposes may be repurposed and used as high-speed links that may be provided to the external environment, for example, when such a board is enclosed in a device housing having an accessible front panel 140. In other implementations, the links may be made accessible using an extender card to increase the number of communication links to the external environment. In some applications, these PCIe links 120 may be configured to operate as Ethernet links when the reference clock of the PCIe links 120 is chosen such that it corresponds to one of the recognized Ethernet clock frequencies under the Ethernet standard and it approximates the PCIe standard reference clock value as closely as possible by adjusting above or below this reference clock value.

Example methods of repurposing host interface connectors to increase the number of high-speed serial link available in PCIe FPGA boards 110 and thereby the number of communication ports is described below. The methods of increasing the number of high-speed links available on the PCIe FPGA boards may be implemented within a PCIe board enclosure and/or a PCIe board extender card.

A method for utilizing PCIe links 120 as network links, implemented using a housing or enclosure, is described with reference to FIG. 6. As shown in the configuration 600 of FIG. 6, a PCIe FPGA board may be mounted within an enclosure such that each PCIe link may be connected to a port 660 located on a front panel of the enclosure. This may allow the number of network ports to be increased by up to number of PCIe links available on a PCIe board (1, 4, 8, 16).

As depicted in FIG. 6, an enclosure card receptacle 692 defines electronic coupling 690 (e.g. a PCIe receptacle or female connector) that may be configured to receive host interface connectors of a data card 110. The electrical coupling 690 may be connected to external connection ports 660 by a plurality of electrical connections. For example, the electrical coupling 690 may be electrically connected to a switch fabric 130. The switch fabric 130 may control electrical connections between the coupling 690 and the external communications ports 660.

The receptacle 692 can be provided to couple the host interface connectors to traces on the motherboard of device 100. The traces may connect the switch fabric 130 to the electronic couplings 690 and/or ports 660. The switch fabric 130 may then control switches to route signals between the electrical coupling 690 and external communications ports 660, so that the host interface connections may be accessible using the external communication ports 660. The switch fabric 130 may also control switches to route signals between the electrical coupling 690 coupled to a first data card 110A and the electrical coupling 690 for other data cards 110B-110N.

The host interface connectors for a data card 110 can include electrical contacts that project from a surface of an edge of the data card PCB to define data card edge connectors with a plurality of electronic contact surfaces (not shown) and a plurality of connector positioning surfaces (not shown), the latter being usable for aligning the data card to the an appropriate connector. The receptacle 692 can include a plurality of complementary electronic contact surfaces (not shown) for contacting the plurality of electronic contact surfaces of the plurality of host interface connectors when the host interface connectors are received into the card receptacle 692. The housing of device 100 may also include plurality of enclosure positioning surfaces (not shown) for contacting the plurality of connector positioning surfaces to align or position the plurality of host interface connectors relative to the housing of device 100 such that the plurality of electronic contact surfaces of the plurality of host interface connectors contact the matching electronic contact surfaces of the data card receptacle (i.e. the second plurality of electronic couplings 690). In some embodiments, the receptacle 692 can establish a PCIe-compliant interface for receiving a PCIe compliant data card 110.

Another example process for repurposing host interface connectors to use PCIe spare links as network links is described reference to FIG. 7. The configuration 700 shown in FIG. 7 may be especially useful for low-profile cards where the size of the back panel may significantly limit the number of serial links available.

As shown in FIG. 7, an extender card 791 may be introduced to increase the number of high speed serial links in a low-profile PCIe FPGA board 720 by converting it into a full-size PCIe board.

In some embodiments, as shown in FIG. 7, the extender card 791 may have a PCIe receptacle connector 792 on one side and PCIe edge connector 751 on the opposite side. The dimensions of the extender card 791 may be chosen such that when a low-profile PCIe card 720 is plugged into it, their combined height may be equivalent to that of a full height PCIe board. There may be several configurations of the extender card 791, each one providing a different number of outgoing PCIe links, thereby allowing the remaining incoming links to be used as external high-speed serial links.

As shown in FIG. 7, the host interface connectors 750 can include electrical contacts that project from a surface of an edge of the printed circuit board 730 to define data card edge connectors with a plurality of electronic contact surfaces (not shown) and a plurality of connector positioning surfaces (not shown), the latter being usable for aligning the data card to an appropriate connector.

As depicted in FIG. 7, the data card extender 791 may comprise a receptacle connector 792 for interfacing with host interface connectors 750 on the data card 720. The receptacle connector 792 may be provided on a first edge of the data card extender 791. The data card extender 791 may further comprise one or more data card extender ports 740' on a second edge of the data card extender 791. The second edge may be oriented at least 80 degrees relative to the first edge, such that when the first edge is adjacent an edge of the data card, and both the data card extender 791 and the data card 720 are inserted into a device housing, the second edge can be externally accessible via the opening of the housing into which the data card and the data card extender 791 were inserted. In many embodiments, the angle of the first edge to the second edge would be approximately 90°, but other angles are also possible provided the second edge remains externally accessible when the card extender 791 is within the housing. The data card extender 791 may comprise connector card host data connectors 751, and may be used to repurpose data card host interface connectors 750 into additional data links, as described in more detail below.

An enclosure or data card extender 791 may repurpose any number of data card host interface connectors 750 to transmit signals suitable for communication by data card connectors 740. For example, in some embodiments the data card may be a PCIe X16 FPGA board, and may therefor comprise 16 PCIe links. Such a data card may be connected to an X16In/X1Out data card extender, in which the X1Out corresponds to the number of "outgoing" PCIe links being routed to the host interface connectors of the data card extender 751 and not usable for repurposing. In this configuration, the remaining 15 PCIe links from the extender card may be repurposed or converted to transmit signals suitable for transmission using additional data connections 740'. Data card extenders may also be X16In/X4Out (up to 12 additional links gained), X4In/X1Out (up to 3 additional links gained), or any other available data card extender, and may enable various numbers of host interface connectors to be converted into data card connectors. Table 1 illustrates possible In/Out combinations that may be achieved using different low-profile PCIe board configurations in conjunction with a given extender card.

TABLE 1

| PCIe low-profile boards (incoming PCIe) | outgoing PCIe | Max number of additional links gained |
|---|---|---|
| X4, X8, X16 | X1 | 3, 7, 15 |
| X8, X16 | X4 | 4, 12 |
| X16 | X8 | 8 |

For example in some embodiments, a PCIe X16 low-profile FPGA board may be connected to an "X16In/X1Out" extender card. In this configuration, 15 PCIe links from the board may be used as external serial links.

An embodiment illustrating the use of repurposed PCIe links for networking applications is now described. Specifically, in some embodiments, PCIe links may be configured to be used as Ethernet links. Generally, PCIe boards may be driven by a PCIe standard frequency reference clock signal through the PCIe interface. On the other hand, standard Ethernet reference clocks are typically driven at a different frequency than the PCIe reference clock. Therefore, to repurpose PCIe links as Ethernet links, an Ethernet reference clock signal can be provided to the PCIe card to accomplish this task. Depending on the configuration of the PCIe board, in some cases, it may also be possible to provide this reference clock signal using a clock signal source available on the data card 110 itself, such as a local signal generator or signal conditioning unit. Alternatively, a central signal generator can provide the signals for multiple data cards 110 in a device 100 or multiple devices 100.

An example method of how the signal generator can be configured to provide the same reference clock for both PCIe and Ethernet communications is described below. The method is illustrated by way of an example of using 10 Gigabit Ethernet (10 GbE) as the Ethernet standard. The signal generator can define a 10 GbE reference clock configured to conform to the 10 GbE standard in order for the resulting links to be functional.

According to the Ethernet standard, there is a set of Ethernet reference clock frequency values that can be selected as a source. Since both sides of the PCIe communication link may be accessible, reconfiguring them may affect the internal PCIe link rate, but need not affect the integrity of the system as a whole.

A number may be selected which both corresponds to one of the recognized 10 GbE standard reference clock values and approximates the PCIe standard reference clock value as closely as possible (e.g. next value up and/or down). The selection of the approximations (up or down) to use, may vary depending on the specific system implementation details. The resulting value may be used by the signal generator as a reference clock frequency; the clock signal based on this reference clock frequency may then be fed into the card 110 through the PCIe interface.

Embodiments described herein may use a reference clock signal for 10 GbE conforming to the 10 GbE standard to provide a functional Ethernet link. The same clock signal source may be used for both 10 GbE and PCIe communications. As a result, the FPGA design may be significantly simplified where PCIe (i.e. host interface connectors) and 10 GbE links (i.e. data card connectors) are configured to transfer data between each other. In some embodiments, a reduced/increased PCIe link rate may fall out of the PCIe standard. This outcome may not necessarily present a problem in usage since the same reference clock signal mat be used for the PCIe root port as well.

For an FPGA-based data card 110, data signals may be generated by the FPGA, for example by programming the FPGA with appropriate components such as FPGA Intellectual Property (IP) Cores specifically for using a PCIe PHY or Ethernet PHY. Accordingly, multiple computational or logic cores may be installed so that the FPGA may be operable to output signals corresponding to various signaling standards along the same signal line when a proper reference clock for those signaling standards is provided. In other embodiments, the FPGA may require additional logic cores to implement communication in a different protocol and to provide signal conversion for other portions of the FPGA for processing.

In some cases, at least one of the data cards 110 may be a line card. A line card may be configured with only QSFP ports, such as a Quad Small Form-factor Pluggable (QSFP) line card for example. These ports can be used to receive incoming data from external devices and to transmit data to those external devices, over a network.

A line card may be used to increase the number of data card connectors provided on the device 100, and in turn the available external communication connectors. This may increase the external data transmission bandwidth of the device 100, allowing the device to transmit, and receive, more data with external devices. The specific configuration of the data cards 110 and the balance between data processing cards and data transmission cards configured with mostly, or only data transmission ports, may be selected based on the desired operational parameters as a trade-off between data processing power vs data receiving power.

The data cards 110 in device 100 may each be electrically connected to one another. A plurality of electrical connections can be provided between the data cards so that each data card 110 is connected to every other data card 110, either directly or indirectly. The electrical connections may enable signals to be routed between, and through, the various data cards 110 to access the appropriate resources for the data processing function required.

For example, incoming data may be received by one of the data cards 110 in the device 100, such as data card 110A. The incoming data may be associated with one or more data processing functions providable by the data cards 110 in device 100.

The incoming data can be received through a data card connector on data card 110A that is coupled to an external device, such as a remote server 205, through an external communication port. The incoming data may be received using a data communication protocol that corresponds to the second signaling standard (i.e. a standard different from the default standard for the host interface connectors such as Ethernet).

Data signals compliant with the second signaling standard can be derived from the incoming data received by the data card 110A. The derived data signal can then be routed through the data card 110A to other data cards (e.g. data cards 110B-110N) via the repurposed host interface connectors and the plurality of electrical connections. The data signals can be routed to the various data cards 110A-110N to allow the processors on those data cards 110A-110N to perform the data processing functions associated with the incoming data.

The device 100 may also include at least one card management data processor. Each card management data processor is a computer processor, such as a general purpose microprocessor. In some other cases, card management data processor may be a field programmable gate array, application specific integrated circuit, microcontroller, or other suitable computer processor. In the description herein below, reference may be made to a card management data processor for simplicity, although it should be understood that multiple card management data processors may be used, e.g. to provide parallel or distributed processing.

In some cases, the card management data processor may not be provided directly on the device 100. For example, in embodiments of the system 200 shown in FIG. 2 with a plurality of devices 100, a central card management data processor may be configured to manage multiple devices 100.

The at least one card management data processor may be configured to define the active electrical connections between the data cards 110 to route the incoming and outgoing data signals. For example, the at least one card management data processor may identify the required data processing functions and route incoming signals to data cards 110 suitable for performing those data processing functions.

In some cases, the at least one card management data processor may allocate various data processing functions to different data cards 110 on the device 100. The at least one card management data processor may determine a function allocation by, for each data processing function of a plurality of data processing functions, allocating that data processing function to an associated data card 110 within the plurality of data cards 110. The associated data card 110 for a particular function may be determined based on the functions providable by that data card 110, e.g. the processing cores provided on that data card 110. The at least one card management data processor may then route signals between the data cards 110 using this function allocation to identify the appropriate data card or cards 110 for different data processing needs.

The data management processor may determine the function allocation for the device 100 based on resources providable by the various data cards 110. For example, each data card 110 may be capable of providing a resource or a plurality of resources (e.g. a resource may correspond to one or more FPGA cores on that data card). The resources provided on each data card 110 may be suitable to execute a variety of data processing functions, such as acceleration functions, image processing functions, encryption/decryption functions etc. The data management processor may define the function allocation for the device 100 (or multiple devices 100) by mapping each data processing function to a corresponding resource in the plurality of resources provided by the plurality of data cards 110. The data management processor may then route the derived data signals between the various data cards 110 to provide the required functions accordingly.

The data management processor may determine the resources providable by a particular data card based on resource information signals received from the data cards 110. The data management processor may receive a plurality of resource information signals that include, for each data card in the plurality of data cards, a resource information signal indicating at least one resource available on that data card.

The data management processor may also determine a plurality of sets of substitutable resources. For each processing function to be provided by the device 100 (or devices) the data management processor may determining a set of substitutable resources where each resource in the set of substitutable resources is suitable for providing that function. The sets of substitutable resources can include at least two resources provided by at least two separate data cards 110, where the associated processing function is providable by each of those two resources.

The data management processor may be configured to update, or revise, the function allocation for some of the data functions to replace one data card by a different data card having a substitutable resource. The function allocation may be permanently updated (e.g. if a data card is permanently unavailable or being re-configured to provide different functions) or temporarily updated (e.g. for a particular incoming signal or to manage temporary unavailability or low bandwidth for a particular card). This may allow the resources (and in effect data cards 110) to be wholly or partially substitutable for another, in situations where increased processing capacity is required, or where one of the data cards 110 is currently unavailable (e.g. ineffective or being reconfigured).

In some cases, the data management processor may be configured to update the function allocation during run-time. That is, the data management processor may update the function allocation to replace one data card in the at least two separate data cards with a different data card in the at least two separate data cards occurs while performing data processing functions.

As shown in FIG. 1, a cross-point fabric 130 (e.g. a cross-point switch network) may be used to electrically connect the data cards 110 to one another. The at least one card management processor may adjust the switches in the cross-point fabric to route the signals through and between the data cards 110. The at least one card management processor may be configured to continually re-configure the active electrical connections (e.g. by opening and closing switches) provided by the cross-point fabric 130 based on real-time data processing and data communication requirements.

The data cards 110 may be electrically connected via the cross-point fabric so that at least one host interface connector from each data card 110 is connected to at least one host interface of another data card 110. The cross-point fabric 130 can also be configured so that each data card 110 can be electrically connected to every other data card 110. Various different configurations may be used to connect the data cards 110 to one another, including connecting each data card 110 to every other card directly via the cross-point fabric 130, or to one or more data cards 110 indirectly via other data cards (e.g. daisy-chaining).

Figure 5:
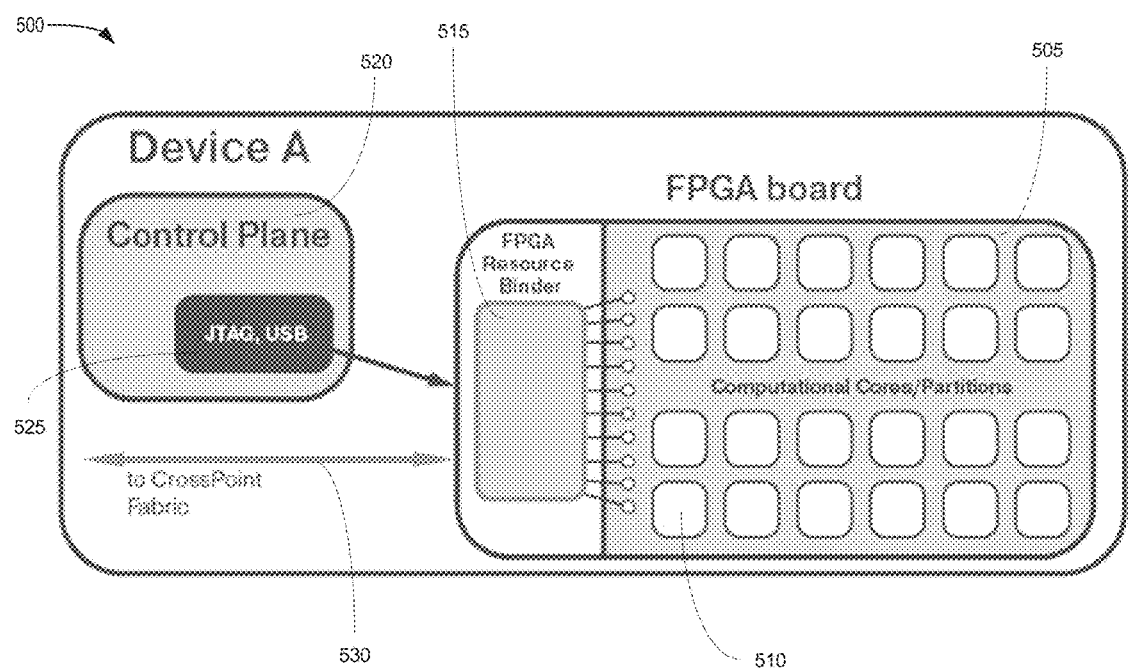
FIG. 5 is an illustration showing a block diagram of a portion of a data processing device in accordance with an example embodiment.

As mentioned, the various data cards 110 may provide different data processing resources. Depending on the particular application, the particular resource requirements may change over time. Accordingly, individual data cards 110 may also be re-configured to increase or decrease available bandwidth for a particular resource correspondingly. In some cases, the re-configuration of the data cards 110 may occur during run-time (e.g. while the device 100 is active) without requiring the device 100 to be rebooted. While a particular data card 110 is being re-configured, the at least one card management processor may adjust the switches in the cross-point fabric 130 to route the signals through the other data cards 110 if necessary. An example process for data card image provisioning managed by a control plane 520 is shown in FIG. 5 described below.

The at least one data management processor can also be configured to monitor the operation of the data cards 110 on device 100. The data management processor may identify one or more data cards 110 that are ineffective (e.g. completely non-operational or having non-operational processing cores). The data management processor may then update the allocation of data processing functions in response to determining that the data card 110 is ineffective.

The data management processor may identify at least one data processing function of the plurality of data processing functions allocated to the at least one ineffective data card. The data management processor can determine an updated function allocation by allocating each data processing function formerly allocated to the at least one ineffective data card to a different (replacement) data card in the plurality of data cards. The data management processor may then determine an updated route for routing the derived data signals through the plurality of data cards based on the updated function allocation. The cross-point fabric 130 may then be re-configured to re-route the derived data signals accordingly.

When an ineffective data card is identified, the data management processor can transmit an ineffective card signal to an external operator to notify the external operator of the ineffective card. This may indicate to an external operator that the ineffective data card may need to be fixed or replaced.

The cross-point fabric 130 may provide various advantages for device 100. For example, using cross-point switches to electrically interconnect the data cards 110 may provide considerable power saving due to the elimination of cabling. Furthermore, installing the devices 100 within already existing infrastructure may not require physical intrusion in each server, and as a result may save a lot of cabling.

In a specific example, the interconnect bandwidth provided by the switch fabric 130 may reach upwards of 200 Gbps (12.5 Gbps multiplied by 16 PCIe links 120) for an FPGA data card 110. The interconnect bandwidth may be unaffected, or substantially unaffected, by hardware installed in the servers (NICs, etc.). In example with 16 full-length PCIe FPGA data cards 110 within a single device 100, the total aggregated interconnect bandwidth may be upwards 3.2 Tbps.

The device 100 may also include data cards 110 (e.g. FPGA boards) from different manufacturers. These data cards may be implemented as nodes within device 100 so long as they include suitable host interface connectors, such as PCIe edge connector.

Using a cross-point fabric to interconnect a plurality of data cards may facilitate modifying the data card interconnects (and in turn the signal routing) based on the particular application and its resource requirements. For example, data from one data source can be fed directly into multiple FPGA boards 110 for a parallel computation task. This may allow the computational task to begin on all FPGA boards 110 at the same time. The final result of the task can then be read from each FPGA board via a daisy chain previously configured within the cross-point switch fabric 130.

Figure 8:
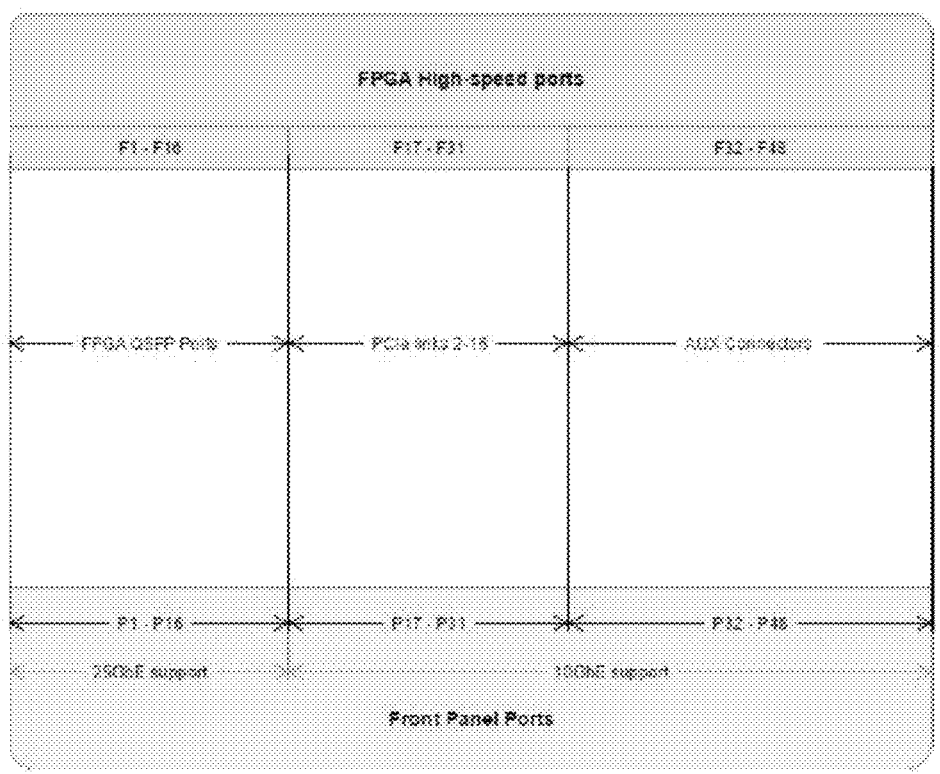
FIG. 8 is an illustration showing a schematic view of a port mapping architecture in accordance with an example embodiment.
Figure 9:
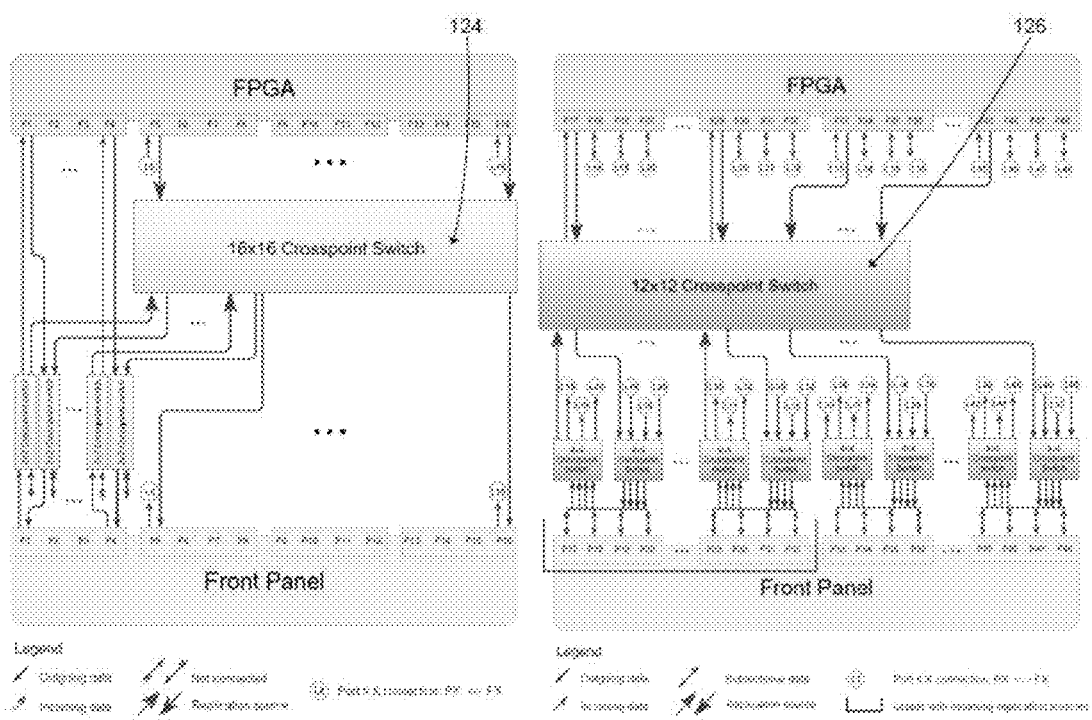
FIG. 9 is an illustration showing a schematic view of a switch network for a data processing device in accordance with an example embodiment.

An example configuration of a cross-point fabric 130 for a single data card 110 is shown in FIGS. 8 and 9. The example cross-point fabric configurations shown in FIGS. 8 and 9 can be expanded in an analogous manner to provide a cross-point fabric 130 for a plurality of data cards 110 as in device 100.

The switch fabric 130 may include electrical connections to external communication ports of device 100 and the data card connectors and host interface connectors of each data card 110. The switch fabric 130 can be configured by the card management data processor to map at least one connector in the plurality of data card connectors and host interface connectors for each data card 110 to at least one external communication port by establishing an electronic communication pathway from the at least one connector in the plurality of data card connectors and host interface connectors to at least one external communication port using a plurality of electrical connections.

As depicted in FIG. 8, in some embodiments various ports on a data card 110, such as QSFP ports, PCIe links and other auxiliary connectors such as USB, SATA, and SAS connectors, may be mapped to external communications ports on the front panel of device 100. In some default configurations each port of the data card 110 may be given a designation, such as F1 to F48, while each external communication port may be given a designation, such as P1 to P48. Each F port may be routed to its counterparty P port with the same number, while data sent in the opposite direction can also conform to the same routing.

In some embodiments in which a first subset of the external communications ports operate at a different speed than a second subset, it may be advantageous to choose corresponding data card and user interface connections based on desired data transfer speeds.

In some embodiments the user interface may enable a user to reroute data along any route chosen. In some embodiments the switch fabric 130 may be configurable to switch only between external communication ports. All switching can take place through the switch fabric 130.

In some embodiments the switch fabric 130 can include a plurality of sub switch fabrics. Each sub switch fabric may operate independently of each other sub switch fabric and be operable to transfer electrical signals between a corresponding subset of external communication ports and a subset of connectors in the plurality of data card connectors and plurality of host interface connectors. In some embodiments the switch fabric 130 may comprise at least a first switch fabric and a second switch fabric. In some embodiments, the first sub switch fabric may transfer data at a first maximum bit-rate that is greater than a second maximum bit rate of the second sub switch fabric.

For example, as depicted in FIG. 9, more complicated port mappings (e.g. customized port mappings) may replace the default one-to-one mapping described above. The switch fabric may comprise a first sub switch fabric and a second sub switch fabric. Each fabric may use one primary and several smaller cross-point switches.

In some embodiments, as depicted in FIG. 9, the first sub switch fabric is served by one primary 16×16 cross-point switch 124 aided by multiple 2×2 cross-point switches. This architecture may be provided with replication rules, which may determine the number of external communication ports set as replication sources. For example, where the ports are 25 Gbps ports, the replication rules may allow four independent 25 Gbps external sources, two 50 Gbps external sources, or one 100 Gbps external source.

In some embodiments, as depicted in FIG. 9, the second sub switch fabric can be served by primary 12×12 cross-point switch 126 aided by multiple 4×4 cross-point switches. A quad-based architecture may set additional rules on replication, which may determine the number of external communication ports set as replication sources. As depicted in FIG. 9, in some embodiments, the sub-switching fabrics may be substantially independent.

In addition to connecting the data connectors and host interface connectors of the data cards 110 to external communications ports (as shown in FIGS. 8 and 9), the switch fabric 130 can also interconnect the data connectors and host interface connectors of the data cards 110A-110N in an analogous manner. The switch fabric 130 can thus route data signals between and through multiple data cards 110, based on the required data processing and data transmission functions of a particular implementation.

Figure 2:
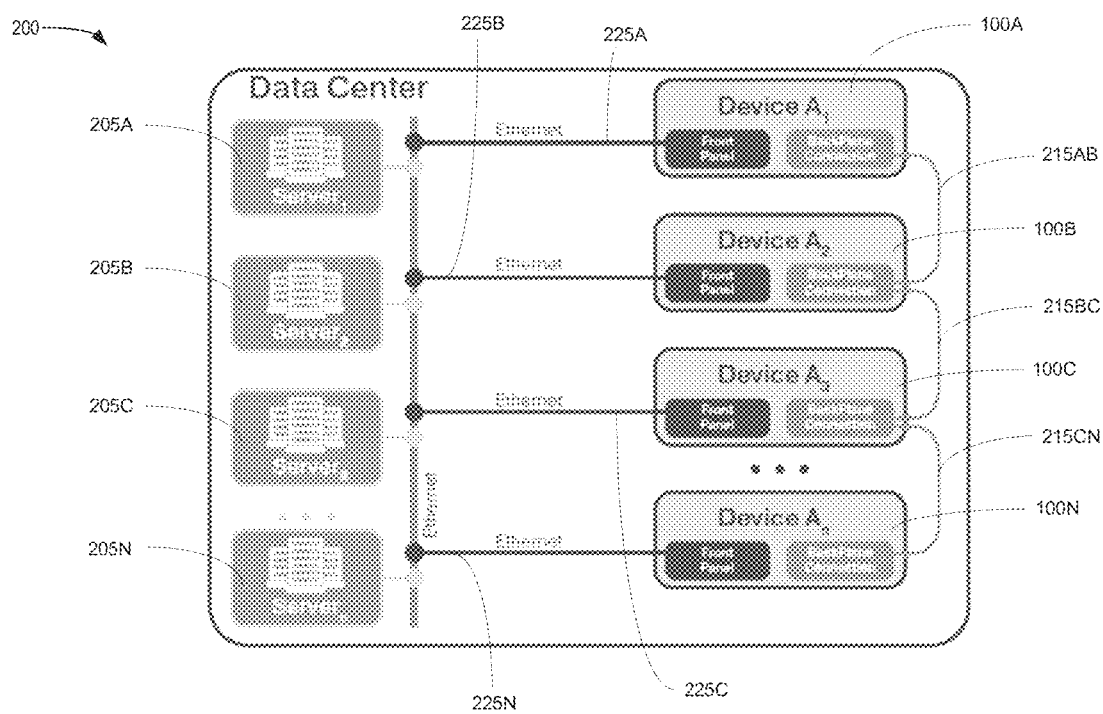
FIG. 2 is an illustration showing a block diagram of an example data processing system in accordance with an example embodiment.

Referring now to FIG. 2, shown therein is an example data processing system 200 in accordance with an example embodiment. Data processing system includes a plurality of data processing devices 100A-100N interconnected via backplane connections 215. A plurality of servers 205A-205N are connected to data processing devices 100A-100N via high-speed network connections 225A-225N, in this example using Ethernet.

As shown in FIG. 2, each server 205A-205N can be connected to any of the data processing devices 100. In the system 200, the data processing devices 100 are coupled using a cross-point switch network connected to the backplane and front panel of the devices 100. Accordingly, the devices 110 can be easily connected to external networks 225, either directly or through other devices via the backplane connections 215. Additionally, the system 200 may be easily adjustable and scalable as devices 110 are added to, and removed from the cross-point switch network.

The system 200 may provide a distributed grid of data processing devices 100 that can be managed homogeneously, as each device 100 is simply an end point of an Ethernet connection. However, within each device 100, the data cards 110 may provide different functions and may include different types of data cards. Accordingly, the system 200 may be heterogeneous node-wide (i.e. the devices 100 at different nodes of the system 200 can provide different resources) to provide greater flexibility for data processing functions with simplified system management.

Furthermore, the system 200 may provide servers 205 with access to additional resources without requiring hardware modifications. For instances, servers 205 without PCIe receptacles or slots may not require customized data cards to access resources typically provided by PCIe compatible data cards as those resources may be accessed through Ethernet connections.

In a first implementation example, a device 100 may host 16 Xilinx XUPP3R FPGA boards 110 from Bittware with Xilinx Virtex Ultrascale+ VU13P and 4 banks of DDR4 memory. Such a device may provide resources totaling close to 60 million logic cells and 4 TB of DDR4 memory.

In a second implementation example, a device 100 may host 16 Nallatech 510T FPGA boards 110 with 2 Arria10 1150GX FPGAs, 8 DDR4 memory banks and 1 HMC each. Such a device may provide resources with greater than 36 million logic elements, 512 GB DDR4 and 32 GB HMC memory. Such a device may provide aggregated memory bandwidth close to 30 Tbps.

As mentioned, in some cases a device 100 may host different types of data cards 110. Accordingly, a third implementation example may have a device 100 hosting 8 Bittware boards 110 and 8 Nallatech boards 110 described above. In a fourth implementation example, a device 100 may contain 8+ mid-size FPGA chips such as Kintex Ultrascale 060 paired with an 8+ HMCs. Both devices may share the same interconnect architecture (i.e. cross-point fabric 130) and thus can be accessible via the same interconnect grid.

The devices 100 connected to network connections 225 can provide a distributed FPGA grid operable at hardware and transport levels. In some cases, a virtual device driver framework may provide an abstraction level for data card resources, such as FPGA resources, to be used by servers such as the servers 205. The virtual device driver framework may be used separately from, or in combination with, the data processing device 100 and system 200 described herein above.

Figure 3:
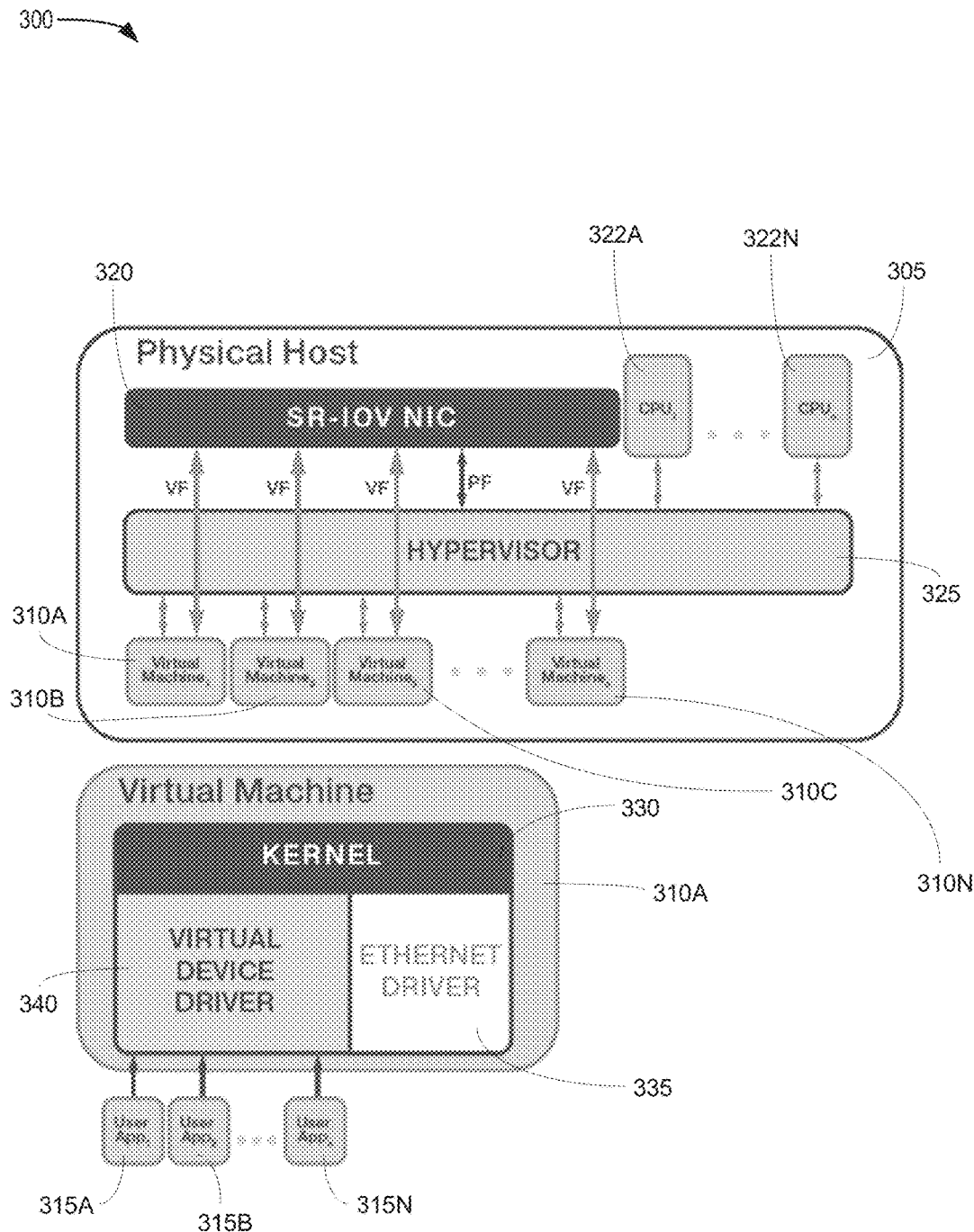
FIG. 3 is an illustration showing a block diagram of an example virtual data processing system in accordance with an example embodiment.

FIG. 3 illustrates an example of a virtual network configuration 300 that may be used to provide access to resources located on remote data cards 100. A virtual device driver 340 can be loaded into an operating system (either physical or virtual), that may mimic the presence of actual FPGA hardware in the computing system. In the example shown in FIG. 3, the driver 340 is installed for use with the kernel 330 of virtual machine 310A.

A user application 315 can communicate with the virtual machine 310 to request resources required to execute the application 315. The resources may be provided by processors 322 located on devices such as device 100 that are located remotely from the computing system on which the user application 315 is being provided. The virtual device driver 340 on virtual machine 310A may intercept these resources requests and route them to the appropriate processor 322 via hypervisor 325.

The driver 340 may provide a familiar PCIe environment such as allocating DMA buffers, BAR transfers, etc. to the operating system on which the application 315 is running. The resource requests may be sent over the network using a low-overhead protocol to the FPGA cards 110 sitting inside devices 100, e.g. located within a data center.

Figure 4:
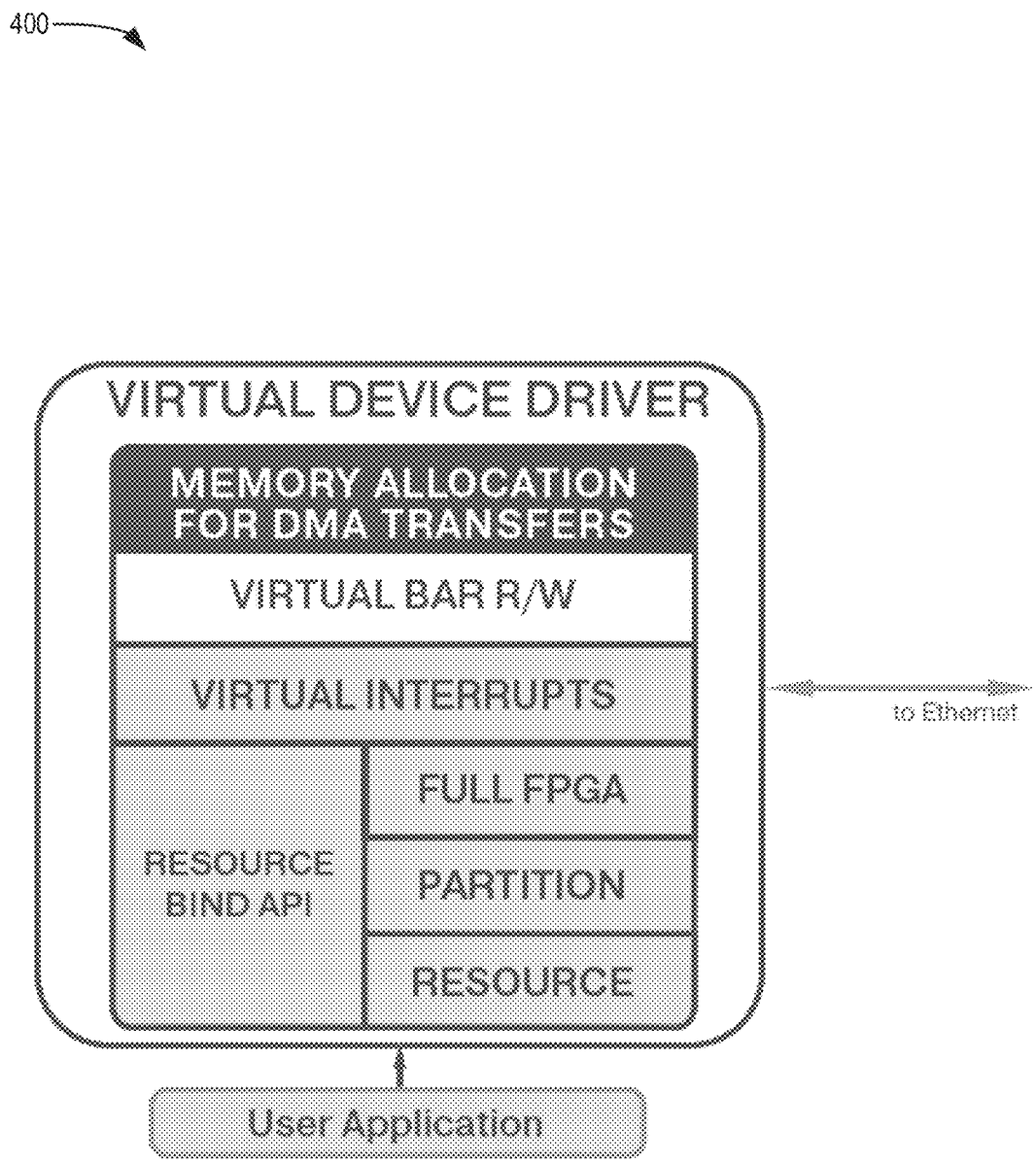
FIG. 4 is an illustration showing a block diagram of an example virtual device driver in accordance with an example embodiment.

FIG. 4 illustrates an example of a virtual driver 400 that may be used as the virtual device driver 340 in virtual network configuration 300. FPGA network ports may process the incoming data, retrieve the requests and export it to FPGA in, for example, native memory mapped or streaming format. Corresponding actions may be repeated on the way back, thus completing the loop.

As partially depicted in FIG. 5, a set of debugging tools 525 including JTAG, Serial port, power control, etc., may be available on the control plane 520 for each data board 505 on a device 500. The partial device 500 depicted in FIG. 5 may correspond to a portion of an embodiment of device 100. The controller plane 520 may enable the card 505 to be programmed universally regardless of board make and model. A user may also remotely develop and debug FPGA applications using the control plane 520.

As shown in FIG. 5, the device 500 may be connected to a network via cross-point fabric connection 530. The device 500 may form part of a distributed grid of data cards ready to run at hardware and transport level. The virtual device driver framework described herein may also include a resource binder component 515 on device 500. The resource binder 515 may communicate with the virtual device driver 340 to perform resource allocation for a user application 315. The resource binder 515 may allow selection of resource type, time, etc.

As shown in FIG. 5, each data card 505 may include a plurality of computational cores or partitions 510. The computational cores 510 (and resources provided by the computation cores) on data card 505 may be allocated to requesting devices either individually or as a group. For example, the resource binder 515 may allow the entire data card 505, including all computational cores 510) to be loaded for a virtual driver 340. This may allow a custom FPGA image received from the virtual driver 340 to be loaded with the virtual driver owning the whole FPGA board 505, at least for the during of the resource request.

In some cases, the resource binder 515 may allow a computational partition 510 to be loaded for a virtual 340. For example, a partial reconfiguration protocol may be implemented to load the partition 510.

In some cases, the resource binder 515 may load computational cores 510 based on the resources provided by those cores 510. For example, the resource binder 510 may assign predefined internet protocol (IP) cores 510, such as acceleration, image processing, etc. to a requesting virtual driver 340.

The list of available resources, their types, etc. may be accessible to a requesting device using a framework scanning Application Program Interface (API). The list of available resources may be accessible to all devices connected to the network, including FPGAs accelerating the cloud itself, operating systems (both hypervisor and virtual for example) and end users directly. In this way many virtual machines (VMs) 310A-310N can share a single FPGA board 322, with each VM 310 operating substantially as if it has a whole FPGA board 322 fully for itself. Moreover, a VM 310 can be allowed to access resources from multiple FPGAs 322 connected via a virtual device driver 340. In some cases, as shown in FIG. 3, the VM host 305 may be equipped with at least one Single Root Input/Output Virtualization (SR-IOV) capable Network Interface Card (NIC) 320.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method for executing a plurality of data processing functions, the method comprising:

providing a plurality of data cards, each data card in the plurality of data cards comprising
a printed circuit board,
a plurality of host interface connectors connectable with an internal data bus of a host computer system to transfer data card signals compliant with a first signaling standard between the data card and the host computer system, and
a plurality of data card connectors connectable with at least one external device to communicate with the at least one external device using external data card signals compliant with a signaling standard different from the first signaling standard, for each data card in the plurality of data cards, converting the data card to convert the data card signals transmitted from the plurality of host interface connectors from being compliant with the first signaling standard to be new data card signals compliant with a second signaling standard different from the first signaling standard;

providing a plurality of electrical connections between the plurality of data cards by, for each data card in the plurality of data cards, connecting at least one host interface connector in the plurality of host interface connectors for that data card to at least one host interface connector of another data card in the plurality of data cards;

providing incoming data to at least one data card in the plurality of data cards;

routing derived data signals, the derived data signals being derived from the incoming data and compliant with the second signaling standard, through the plurality of data cards via the plurality of electrical connections and, for each data card in the plurality of data cards, at least one host interface connector in the plurality of host interface connectors for that data card; and performing the plurality of data processing functions within the plurality of data cards based on the derived data signals.

2. The method as defined in claim 1, further comprising, before routing the derived data signals through the plurality of data cards, determining a function allocation by, for each data processing function of the plurality of data processing functions, allocating that data processing function to an associated data card within the plurality of data cards; and, determining a route for routing the derived data signals through the plurality of data cards based, at least in part, on the function allocation.

3. The method as defined in claim 2, wherein the plurality of data cards comprises a plurality of FPGA data cards, each FPGA board in the plurality of FPGA boards initially operating according to a Peripheral Component Internet (PCI) Express standard such that, for each FPGA data card in the plurality of FPGA data cards, the first signaling standard for the plurality of host interface connectors for that data card is a PCI Express standard, the second signaling standard being different from the PCI Express standard.

4. The method as defined in claim 3, wherein
the second signaling standard is Ethernet; and,
for each data card in the plurality of data cards, converting the data card to convert the data card signals transmitted from the plurality of host interface connectors from being compliant with the PCI Express standard to be new data card signals compliant with the Ethernet standard comprises implementing an Ethernet logic core on that data card to support the Ethernet Standard and providing a carrier signal of Ethernet frequency for the Ethernet standard.

5. The method as defined in claim 2 further comprising
monitoring operation of each data card in the plurality of data cards;
identifying at least one ineffective data card in the plurality of data cards;
determining at least one data processing function of the plurality of data processing functions allocated to the at least one ineffective data card;
determining an updated function allocation, at least in part by, for each data processing function formerly allocated to the at least one ineffective data card, allocating that data processing function to a replacement data card in the plurality of data cards; and
determining an updated route for routing the derived data signals through the plurality of data cards based, at least in part, on the updated function allocation.

6. The method as defined in claim 5 further comprising, after identifying the at least one ineffective data card in the plurality of data cards, sending an ineffective card signal to an external operator to notify the external operator of the ineffective card.

7. The method as defined in claim 2 wherein determining the function allocation comprises operating a data processor controller in electronic communication with the plurality of electrical connections and the plurality of data cards to determine the function allocation.

8. The method as defined in claim 7 wherein
operating the data processor controller to determine the function allocation comprises
communicating the plurality of data processing functions to the data processor controller,
determining a plurality of resources provided by the plurality of data cards, and
mapping each data processing function in the plurality of data processing functions to a corresponding resource in the plurality of resources to implement the function allocation within the plurality of data cards; and,
the data processor controller determines the route for routing the data through the plurality of data cards based, at least in part, on the function allocation.

9. The method as defined in claim 8 wherein mapping each data processing function in the plurality of data processing functions to the corresponding resource in the plurality of resources to provide the function allocation, comprises determining a plurality of sets of substitutable resources, by, for each function of at least some functions in the plurality of data processing functions, determining a set of substitutable resources in the plurality of resources, each resource in the set of substitutable resources being suitable for providing that function, wherein each set of substitutable resources in the plurality of resources comprises at least two resources provided by at least two separate data cards of the plurality of data cards, and
that data processing function is separately providable by each resource of the at least two resources;
the method further comprising, for at least one function of the at least some functions in the plurality of data processing functions, updating the function allocation to replace one data card in the at least two separate data cards with a different data card in the at least two separate data cards.

10. The method as defined in claim 9 wherein updating the function allocation to replace one data card in the at least two separate data cards with a different data card in the at least two separate data cards occurs while performing the plurality of data processing functions within the plurality of data cards based on the derived data signals.

11. The method as defined in claim 8 wherein operating the data processor controller to determine the plurality of resources provided by the plurality of data cards comprises receiving a plurality of resource information signals at the data processor controller, the plurality of resource information signals being compliant with the second signaling standard and comprising, for each data card in the plurality of data cards, a resource information signal for that data card indicating at least one resource available on that data card.

12. The method as defined in claim 3 wherein the at least one data card in the plurality of data cards comprises a line card, the incoming data being provided to the at least one data card via the linecard.

13. A data processing system comprising:
a plurality of data cards, each data card in the plurality of data cards comprising
a printed circuit board,
a plurality of host interface connectors connectable to an internal data bus of a host computer system to transfer data card signals compliant with a first signaling standard between the data card and the host computer system, and,
a plurality of data card connectors connectable to at least one external device to communicate with the at least one external device using external data card signals compliant with a signaling standard different from the first signaling standard;
at least one signal generator for generating a configuration signal to support, for each data card in the plurality of data cards, transmission of new data card signals from the plurality of host interface connectors, the new data card signals being compliant with a second signaling standard different from the first signaling standard;
a plurality of electrical connections between the plurality of data cards for carrying the new data card signals compliant with the second signaling standard, the plurality of electrical connections comprising, for each data card in the plurality of data cards, an electrical connection connecting at least one host interface connector in the plurality of host interface connectors for that data card to at least one host interface connector of another data card in the plurality of data cards; and
an external data connection for providing incoming data to at least one data card in the plurality of data cards;
wherein during operation, the plurality of electrical connections route derived data signals, the derived data signals being derived from the incoming data and compliant with the second signaling standard, through the plurality of data cards via the plurality of electrical connections and, for each data card in the plurality of data cards, at least one host interface connector in the plurality of host interface connectors for that data card, to perform a plurality of data processing functions within the plurality of data cards based on the derived data signals.

14. The system as defined in claim 13 further comprising at least one card management data processor for determining a function allocation by, for each data processing function of the plurality of data processing functions, allocating that data processing function to an associated data card within the plurality of data cards; wherein during operation, each data processing function of the plurality of data processing functions is performed by the associated data card within the plurality of data card according to the function allocation, and the plurality of electrical connections route the derived data signals through the plurality of data cards based, at least in part, on the function allocation.

15. The system as defined in claim 14 wherein
the plurality of data cards comprises a plurality of FPGA data cards, each FPGA board in the plurality of FPGA boards operating, during operation, according to a Peripheral Component Internet (PCI) Express standard; and,
the first signaling standard for the plurality of host interface connectors for that data card is a PCI Express standard, the second signaling standard being different from the PCI Express standard.

16. The system as defined in claim 15 wherein
the second signaling standard is Ethernet;
each data card in the plurality of data cards comprises an Ethernet logic core on that data card to support the Ethernet Standard;
the configuration signal is a carrier signal of Ethernet frequency for the Ethernet standard.

17. The system as defined in claim 14 wherein, during operation, the at least one card management data processor,
monitors operation of each data card in the plurality of data cards;
identifies at least one ineffective data card in the plurality of data cards;
determines at least one data processing function of the plurality of data processing functions allocated to the at least one ineffective data card;
determines an updated function allocation, at least in part by, for each data processing function formerly allocated to the at least one ineffective data card, allocating that data processing function to a replacement data card in the plurality of data cards; and
determines an updated route for routing the derived data signals through the plurality of data cards based, at least in part, on the updated function allocation.

18. The system as defined in claim 17 wherein, during operation, the at least one card management data processor, after identifying the at least one ineffective data card in the plurality of data cards, sends an ineffective card signal to an external operator to notify the external operator of the ineffective card.

19. The system as defined in claim 14 wherein, during operation, the card management data processor is in in electronic communication with the plurality of electrical connections and the plurality of data cards to determine the function allocation.

20. The system as defined in claim 19 wherein, during operation, the card management data processor controller determines the function allocation by
determining the plurality of data processing functions from the incoming data,
determining a plurality of resources provided by the plurality of data cards, and
mapping each data processing function in the plurality of data processing functions to a corresponding resource in the plurality of resources to implement the function allocation within the plurality of data cards; and,
the card management data processor, during operation, determines the route for routing the data through the plurality of data cards based, at least in part, on the function allocation.

21. The system as defined in claim 20 wherein
to map each data processing function in the plurality of data processing functions to the corresponding resource in the plurality of resources to provide the function allocation, the card management data processor, in operation, determines a plurality of sets of substitutable resources, by, for each function of at least some functions in the plurality of data processing functions, determining a set of substitutable resources in the plurality of resources, each resource in the set of substitutable resources being suitable for providing that function;
each set of substitutable resources in the plurality of resources comprises at least two resources provided by at least two separate data cards of the plurality of data cards;
that data processing function is separately providable by each resource of the at least two resources; and,
for at least one function of the at least some functions in the plurality of data processing functions, the card management data processor further, during operation, updates the function allocation to replace one data card in the at least two separate data cards with a different data card in the at least two separate data cards.

22. The system as defined in claim 21 wherein during operation the card management data processor updates the function allocation to replace one data card in the at least two separate data cards with a different data card in the at least two separate data cards while the plurality of data cards are performing the plurality of data processing functions based on the derived data signals.

23. The system as defined in claim 20 wherein during operation the card management data processor determining the plurality of resources provided by the plurality of data cards comprises receiving a plurality of resource information signals at the card management data processor, the plurality of resource information signals being compliant with the second signaling standard and comprising, for each data card in the plurality of data cards, a resource information signal for that data card indicating at least one resource available on that data card.

24. The system as defined in claim 15 wherein the at least one data card in the plurality of data cards comprises a line card, the incoming data being provided to the at least one data card via the linecard.

25. The system as defined in claim 13, wherein, for each data card in the plurality of data cards,
the at least one signal generator comprises an internal clock signal generator on that data card; and
during operation, the internal clock signal generator provides the configuration signal to each host interface connector in the plurality of host interface connectors to convert the data card signals originating from that host interface connectors from being compliant with the first signaling standard to the new data card signals compliant with the second signaling standard.

26. The system as defined in claim 13, wherein
the at least one signal generator comprises an external clock signal generator external to the plurality of data cards; and,
during operation, and for each data card in the plurality of data cards, the external clock signal generator provides the configuration signal to each host interface connector in the plurality of host interface connectors to convert the data card signals originating from that host interface connectors from being compliant with the first signaling standard to the new data card signals compliant with the second signaling standard.

27. A data card housing comprising:
a plurality of data card receptacles for receiving a plurality of data cards, each data card in the plurality of data cards comprising a plurality of host interface connectors connectable to an internal data bus of a host computer system to transfer data card signals compliant with a first signaling standard between the data card and the host computer system;
a plurality of electrical connections between the plurality of data card receptacles for connecting to, for each data card receptacle in the plurality of data card receptacles, the plurality of host interface connectors of a data card received in that data card receptacle, the plurality of electrical connections comprising, for each data card receptacle in the plurality of data card receptacles, a plurality of card connectors for connecting to the plurality of host interface connectors of a data card received in that data card receptacle; and
at least one external data communication port for i) receiving incoming data and providing the incoming data to the plurality of electrical connections, and ii) receiving outgoing data from the plurality of electrical connections and transmitting the outgoing data to at least one external device, external to the data card housing;
wherein during operation, when the plurality of data cards are provided in the plurality of data card receptacles and connected to the plurality of electrical connections, the plurality of electrical connections route derived data signals, the derived data signals being derived from the incoming data, through the plurality of data cards via the plurality of electrical connections and, for each data card receptacle having a data card, at least one host interface connector in the plurality of host interface connectors for that data card, to perform a plurality of data processing functions within the plurality of data cards based on the derived data signals.

28. The data card housing as defined in claim 27 further comprising at least one signal generator for generating a configuration signal, the at least one signal generator being electronically connectable to each data card receptacle in the plurality of data card receptacles to supply the configuration signal to a data card contained in that data card receptacle to support transmission of new data card signals from the plurality of host interface connectors of that data card, the new data card signals being compliant with a second signaling standard different from the first signaling standard, such that, during operation, the derived data signals routed by the plurality of electrical connections are compliant with the second signaling standard.

29. The data card housing as defined in claim 27 further comprising at least one card management data processor linked to the plurality of electrical connections, wherein, during operation when a plurality of data cards are provided in the plurality of data card receptacles, the at least one card management data processor,
for each data card receptacle in the plurality of data card receptacles containing a data card,
receives receptacle-specific data card resource information via the plurality of electrical connections connecting regarding the data card received in that data card receptacle, and
determines at least one resource receptacle-specific resources available on the data card received in that data card receptacle; and then
determines a function allocation by, for each data processing function of the plurality of data processing functions, allocating that data processing function to a selected data card receptacle of the plurality of data card receptacles based on an associated data card received in that selected data card receptacle; such that during operation, each data processing function of the plurality of data processing functions is performed by the associated data card within the plurality of data card according to the function allocation, and the plurality of electrical connections route the derived data signals through the plurality of data cards based, at least in part, on the function allocation.

* * * * *